United States Patent [19]

Galli

[11] 4,297,975

[45] Nov. 3, 1981

[54] DEVICE FOR IMPROVING THE LUBRICATION IN A ROTARY COUPLING

[75] Inventor: Ercole Galli, Turin, Italy

[73] Assignee: Mondial Piston - Dott. Galli Ercole & C. S.p.A., Turin, Italy

[21] Appl. No.: 3,952

[22] Filed: Jan. 16, 1979

[30] Foreign Application Priority Data

Jun. 14, 1978 [IT] Italy .............................. 68373 A/78

[51] Int. Cl.³ .............................................. F02F 3/00
[52] U.S. Cl. .................................. 123/193 P; 92/160
[58] Field of Search ......... 123/193 P, 196 R, 193 CP, 123/41.35; 92/153, 158, 159, 160, 187; 308/240, 2 R; 403/150, 163; 184/6.24, 6.25

[56] References Cited

U.S. PATENT DOCUMENTS

| 1,379,257 | 5/1921 | Gorham | 92/160 |
| 1,923,597 | 8/1933 | Walker | 308/240 |
| 2,702,219 | 2/1955 | Sintz | 403/150 |
| 3,172,304 | 3/1965 | Robertson | 308/240 |

*Primary Examiner*—Ronald H. Lazarus
*Attorney, Agent, or Firm*—Young & Thompson

[57] ABSTRACT

In a rotary coupling, such as the coupling between a piston pin and the holes for the same bored in the bosses of a piston for an internal combustion engine, a device for improving the lubrication, comprising a number of turns of capillary circumferential groove hollowed in one of the coupling surfaces, said groove having preferably a depth ranging from 5 to 20 μm, a pitch ranging from 0.25 to 1 mm and an eccentricity not exceeding 2 μm.

4 Claims, 2 Drawing Figures

DEVICE FOR IMPROVING THE LUBRICATION IN A ROTARY COUPLING

BACKGROUND OF THE INVENTION

The present invention relates to a device intended to provide a satisfactory lubrication in a mechanical rotary coupling which, for the particular installation conditions, can not be effectively lubricated in the known ways. A typical example of such a coupling is the one between the piston pin and the holes formed in the bosses of a piston for internal combustion engines. This coupling is such that the lubrication is effected only by the oil sprays reaching the piston pin surface by passing between the piston bosses and the connecting rod, and then penetrating the coupling to be lubricated. The operating conditions are further made more difficult in that the relative movement occurs within a very limited angle between stopping and reversing positions of the reciprocating motion, and under a high load, with consequent possible seizure phenomena. Attempts have been made till now to improve the operating conditions of such couplings, by means of such an exact machining as to minimize their surface roughness, but this measure has proved insufficient.

BRIEF SUMMARY OF THE INVENTION

The object of this invention is to provide a substantial improvement of the lubricating conditions in a coupling such as that between a piston pin and the piston, or any other mechanical coupling which for any reason presents similar lubricating problems.

This object is attained, according to the invention, in that one of the rotary coupling surfaces has a controlled roughness, due to the presence on it of a capillary channel for the lubricating oil, formed by a number of turns of circumferential grooving.

Due to the presence of such a capillary channel, the oil reaching the surface of one of the coupled members distributes itself effectively in the whole coupling, thereby providing a satisfactory lubrication, and is retained therein by the capillary effect even when the coupling is stationary for a long time long, stop periods of the coupling, thereby assuring the presence of a sufficient lubrication even in the initial phases of the movement.

The effect of said capillary channel is therefore radically different from that of the large grooves of the so-called "spider-legs" currently used in bearings, which are effective only when the lubricating oil reaches them in a sufficient quantity, and in any case, they are not suitable to retain an oil reserve for a substantial time in the absence of lubricant feeding.

Said turns of circumferential grooving may be either the sequential turns of a single-start or multi-start helical groove, or separate parallel grooves.

In the particular application to the coupling between a piston-pin and a piston, in an endothermic engine, the capillary channel according to the invention, if provided as a helical groove, has the further advantage that it allows the development of a lubricant stream which, in addition to the assurance of the coupling lubrication, contributes to the heat removal.

According to a particular feature of the invention, the capillary channel has a depth comprised between 2 and 50 μm, particularly preferably between 5 and 20 μm and most preferably between 8 and 10 μm, and it has a pitch preferably comprised between 0.1 and 2.5 mm, particularly between 0.25 and 1 mm and most preferably between 0.4 and 0.5 mm.

According to another particular feature of the invention, the capillary channel is formed in the coupling surface with a high concentricity precision, and particularly with values of the total eccentricity not greater than ½ of the groove depth, with a particular preference for a limit of eccentricity of ±2 μm.

As concerns the carrying out of the capillary channel according to the invention, a process is particularly preferred which consists in making the groove during the same super-finishing operation (currently called "lapping operation") of the surface. This is preferably done by providing a tool laterally protruding (as a boring bar) from the stem of the blade used for lapping the surface.

BRIEF DESCRIPTION OF THE DRAWING

An example of the invention, in the specified typical application, is diagrammatically represented on the accompanying drawing, wherein.

DETAILED DESCRIPTION OF A PREFERRED EMBODIMENT

Figure 1:
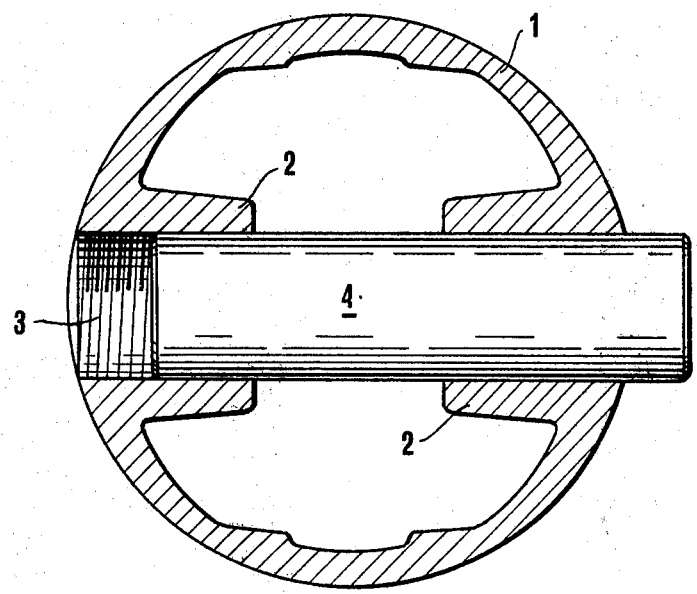
FIG. 1 shows in actual size the cross section of a piston for a thermic motor, taken at the level of the holes for the piston-pin, with the pin being partially inserted.
Figure 2:
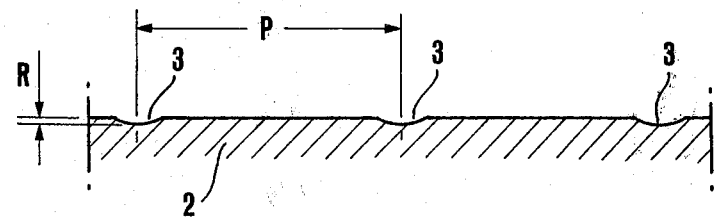
FIG. 2 illustrates a portion of the same cross section, corresponding to the hole for the piston-pin, magnified about 100 times.

Numeral 1 indicates the skirt of a piston, provided with bosses 2 which are bored to form the holes for the piston-pin 4. In this case, the piston-pin 4 is machined in the usual way, with a cylindrical bright surface, while the hole in the bosses 2 has hollowed in its polished surface a groove 3, shown on FIG. 1 as an thin screw thread, whose detail is appreciable only in the great enlargement of FIG. 2. In the case of the illustrated example, the groove 3 has a section of a circle arc with depth R of $9\pm2$ μm and a pitch P of 0.45 mm. Such an embodiment has experimentally proved to provide the desired results.

Of course, the section of the groove may be different than a circle arc and the same groove may be a single-start or a multi-start helical groove or it may result from a set of parallel grooves, and its dimensions may vary within the above specified ranges. Further, instead of being made on the surface of the piston boss holes, the groove may be formed on the piston-pin surface, that is, referring to the general case of any rotary coupling, on the convex surface instead of the concave surface, although in the most cases the first possibility seems to be the preferable.

Having thus described my invention, what I claim is:

1. In a piston for an internal combustion engine, having bosses and in said bosses holes intended to receive a piston pin, of the type in which the piston pin is lubricated only by sprayed lubricating oil reaching the piston pin surface by passing between the piston bosses and a connecting rod and then penetrating between the piston and the piston pin; the improvement that at least a portion of the concave surface of said holes has hollowed therein a number of turns of circumferential grooving having a depth ranging between 2 μm and 50 μm, whereby a capillary channel for lubricating oil is formed.

2. A piston as set forth in claim 1, wherein said turns of said circumferential grooving have a depth range between 8 μm and 10 μm.

3. A piston as set forth in claim 1, in which said turns of circumferential grooving have a pitch ranging between 0.4 mm and 0.5 mm.

4. A piston as set forth in claim 1, wherein said turns of circumferential grooving have, with respect to the surface in which they are hollowed, an eccentricity within the limit of ±2 μm.

* * * * *